Nov. 15, 1966    A. E. TSCHANZ    3,285,551

CONDUIT SUPPORT ASSEMBLY

Filed May 13, 1965

INVENTOR.

August E. Tschanz

BY

Barnard, McGlynn & Reising

ATTORNEYS

United States Patent Office 3,285,551
Patented Nov. 15, 1966

3,285,551
CONDUIT SUPPORT ASSEMBLY
August E. Tschanz, Chalfont, Pa., assignor to Teleflex Incorporated, North Wales, Pa., a corporation of Delaware
Filed May 13, 1965, Ser. No. 455,534
21 Claims. (Cl. 248—56)

This invention relates to an assembly for supporting a conduit or the like and, more particularly, to a body member having a bore therethrough and adapted to be secured in an aperture and including means adapted to be secured thereabout for releasably reducing the diameter of the bore through the body to grip a conduit which may be placed in the bore to prevent such a conduit from moving longitudinally in the bore.

In the marine, aircraft, automotive, and other equipment fields, there is a great utilization of remote control assemblies utilizing a flexible conduit for movably supporting a motion transmitting core element. Such remote control assemblies may include push-pull core elements slidably disposed within a flexible conduit, or they may include a rotary core element rotatably disposed within a flexible conduit. In most of the environments in which such remote control assemblies are utilized, the conduit is secured to a support structure at or adjacent each of the respective ends thereof.

Various devices have heretofore been utilized to secure a flexible conduit to a support structure, and, in particular, there exists a class of devices which have been heretofore utilized to support a flexible conduit in an aperture or bore in a bulkhead, bracket, or the like. However, the devices which have heretofore been utilized to support a flexible conduit, or the like, in an aperture or bore are adapted such that once they are secured to the flexible conduit they may not be removed therefrom, and the conduit cannot be selectively moved relative to the device. For example, some of the prior art devices utilized to support a conduit in a bore are plastic members molded to one end or the other of the flexible conduit so that a chemical bond is formed between the conduit and the supporting device such that the supporting device cannot be removed from the conduit.

The problem with the devices which have heretofore been utilized to support a conduit, or the like, in an aperture, is a result of the fact that it is sometimes convenient, and even necessary, that the conduit extend through and beyond the aperture a predetermined distance depending upon the environment in which the remote control assembly is utilized. For example, a hypothetical situation might be one where a remote control assembly passes through a bulkhead which is situated approximately eight inches from the device to be controlled by the movable core element slidably supported within the conduit. While it may be satisfactory to support the remote control assembly at a position eight inches from its attachment to the member to be controlled insofar as the operation thereof is concerned, the member to be controlled may have a degree of movement of less than one inch so that the motion transmitting core element, normally made of metal, is unnecessarily exposed for the approximate distance of seven inches from the bulkhead toward the element to be controlled if the flexible conduit is supported in the aperture by a device which may only be secured to the end of the conduit. On the other hand, even if a device of the type heretofore utilized is secured to the conduit to support the conduit in an aperture so that the conduit extends through the aperture so as to enclose the motion transmitting core element the seven inches in the above hypothetical situation, devices which have heretofore been utilized do not allow for adjustment of the distance which the conduit extends from the bulkhead so as to be capable of compensating for changes in the degree of movement of the element to be controlled or to allow one remote control assembly to be utilized in various environments where the desired distance the conduit extends from the bulkhead varies. If a device of the type heretofore known in the prior art is secured to the conduit of a remote control assembly remote from the end of the conduit to support the conduit in an aperture, the conduit cannot be selectively moved relative to the conduit to vary the distance the conduit extends from the device therefore requiring the fabrication of a special remote control assembly with the device secured to the conduit at a predetermined distance from one end thereof for each particular environment in which such a remote control assembly is to be utilized.

Accordingly, it is an object and feature of this invention to provide an assembly for supporting a conduit, or the like, which assembly includes means for securing the assembly in an aperture and means for releasably gripping such a conduit to prevent longitudinal movement of the conduit whereby the conduit, although normally held against movement relative to the assembly, may be selectively moved longitudinally through the assembly.

A further object and feature of this invention is to provide an assembly for supporting a conduit, or the like, in an aperture, which assembly may be disposed at a particular position on the conduit to support and prevent longitudinal movement of the conduit in the aperture and which assembly may be moved to a different position along the length of the conduit to support the conduit and prevent longitudinal movement of the conduit relative to the assembly.

In general, these and other objects and features of this invention may be attained by an assembly constructed in accordance with the instant invention and including an elongated body having a bore therethrough and first and second ends. A first tapered portion of increasing diameter extends a predetermined distance along the body from the first end thereof. A flange is disposed radially about the body and a recess is disposed circumferentially about the body between the first tapered portion and the flange. There is at least one slot in the body extending from the first end thereof longitudinally therealong through the first tapered portion and at least partially into the recess for allowing the diameter along the first tapered portion to be decreased. A threaded portion extends from the flange toward the second end of the body and a second tapered portion of decreasing diameter extends from the threaded portion to the second end of the body. There is also at least one slot in the body which extends from the second end thereof longitudinally therealong through the second tapered portion for allowing the diameter of the second tapered portion to be decreased. The bore which extends through the body has a greater diameter from the first end of the body through the first tapered portion and the recessed portion than it has through the remainder of the body. There is also included a nut having threads extending a predetermined distance into the nut from one face thereof and having a third tapered portion within the nut of decreasing diameter as it extends from the threads in the nut to the other face thereof so that as the threads of the nut engage the threaded portion of the body member, the third tapered portion of the nut engages the second tapered portion of the body member to decrease the diameter of the second tapered portion therealong which results in a reduction of the diameter of the bore through the second tapered portion of the body.

Other objects and attendant advantages of the instant invention will be readily appreciated as the same becomes better understood by reference to the following detailed description when considered in connection with the accompanying drawings wherein.

Figure 1:
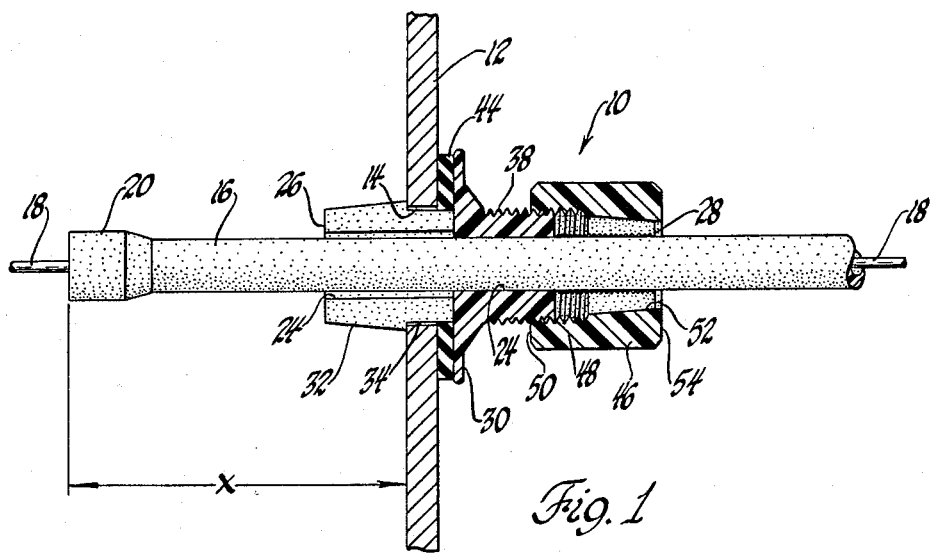
FIGURE 1 is a cross-sectional view of a preferred embodiment of the present invention shown supporting a flexible conduit in an aperture through a bulkhead.

Referring now to the drawings, wherein like reference numerals indicate like or corresponding parts throughout the several views, there is shown, generally at 10, an assembly constructed in accordance with the instant invention for supporting a flexible conduit 16 in an aperture 14.

The member 12 is illustrated as a bulkhead but may also be a bracket, or the like, having an aperture or slot 14 through which the flexible conduit 16 is disposed. The flexible conduit 16 movably supports a motion transmitting core element 18, which may be of the rotary or push-pull type and is attached at one end thereof to a member (not shown) to be controlled and may be manually operated at the other end thereof. A cap element 20 is disposed on the end of the conduit 16 to encapsulate the core element 18 to prevent moisture, and the like, from entering the conduit 16.

Figure 2:
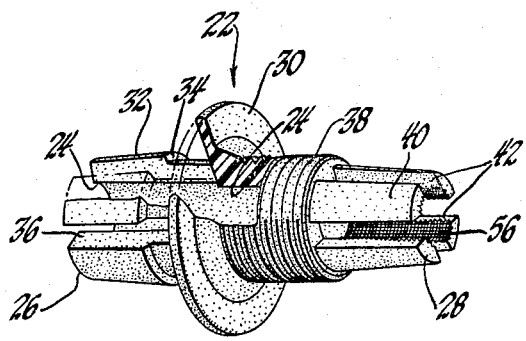
FIGURE 2 is an isometric view partially broken away showing the body portion of the preferred embodiment shown in FIGURE 1.
Figure 3:
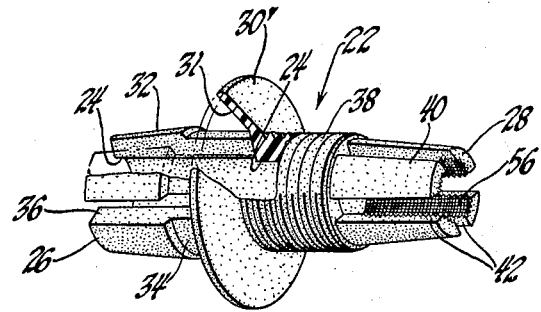
FIGURE 3 is an isometric view partially broken away of another preferred embodiment of the body portion of the present invention.

The assembly 10 includes an elongated tubular body, generally shown at 22, which has a bore 24 extending therethrough from the first end 26 to the second end 28. A flange 30, as in the case of the embodiments shown in FIGURES 1 and 2, or a flange 30', as shown in the embodiment of FIGURE 3, is disposed radially about the body 22. The flange 30' differs from the flange 30 in that it has a flexible portion 31 which extends generally toward the first end 26 of the body. The flexible portion 31 of the flange 30' is spring like and will straighten to a substantially radial position when the body member 22 is disposed in an aperture so that the body member 22 is firmly held in the aperture between the end of the first tapered portion 22 and the flange 30'.

The first tapered portion 32 extends a predetermined distance along the body 22 from the first end 26 thereof and has an increasing diameter as it extends from the first end 26 along the body 22. A recess 34 is disposed circumferentially about the body 22 between the first tapered portion 32 and the flange 30, or the flange 30' in the case of the embodiment shown in FIGURE 3.

There are a plurality of slots 36 in the body 22 which extend from the first end 26 longitudinally along the body 22 through the first tapered portion 32 and through the recess 34. The slots 36 allow the diameter along the first tapered portion 32 to be reduced so that the first tapered portion 32 may be inserted through an aperture 14, or the like.

The body 22 also has a threaded portion 38 which extends from the flange 30, or the flange 30', toward the second end 28 of the body 22 and a second tapered portion 40 of decreasing diameter extends from the threaded portion 38 to the second end 28 of the body 22. A second plurality of slots 42 extend from the second end 28 longitudinally along the body 22 through the second tapered portion 40 to allow the diameter along the second tapered portion 40 to be decreased.

As is evident from the description thus far, the first tapered portion 32 may be inserted through an aperture 14, and as the tapered portion 32 passes through the aperture 14, the diameter thereof is decreased which in turn decreases the diameter of the bore 24 within the tapered portion 32. To compensate for the reduction of the diameter of the bore 24 within the tapered portion 32 so that the conduit 16 is not radially compressed as the tapered portion 32 is being inserted through an aperture 14, the diameter of the bore 24 in the tubular body 20 has a greater diameter from the first end 26 through the tapered portion 32 and the recessed portion 34 than through the remainder of the body 22.

As alluded to hereinbefore, a flexible portion 31 of the flange 30' may be utilized to act as a biasing means against the bulkhead 12, or the like, to firmly secure the body 22 in the aperture 14. Alternatively, a biasing means taking the form of a resilient washer 44, or the like, may be disposed about the recess 34 so as to extend radially outward adjacent the flange 30 for firmly securing the body 22 in an aperture 14 between the flange and the end of the first tapered portion 32. The resilient washer 44 may be made of any appropriate material, such as rubber, or the like.

The assembly also includes the nut 46 having threads 48 therein which are engageable with the threaded portion 38 of the body 22. The threads 48 extend a predetermined distance into the nut from the face 50 thereof and a third tapered portion 52 extends from the threads 48 to the other face 54 of the nut and has a decreasing diameter as it extends from the threads 48 to the other face 54 of the nut 46.

The nut 46 is screwed onto the body member 22 by engagement of the threads 48 with the threaded portion 38, and the tapered portion 52 of the nut 46 engages the tapered portion 40 of the body member 22 to reduce the outer diameter of the tapered portion 40 which in turn decreases the diameter of that portion of the bore 24 which extends through the tapered portion 40 of the body 22. When the nut 46 is threaded onto the body 22 such that the diameter of the bore 24 through the tapered portion 40 is decreased to grip the flexible conduit 16, longitudinal movement of the conduit 16 is prevented. To increase the gripping capacity of the bore 24, appropriate friction gripping means may be utilized within the bore, such as for example knurling the bore 24 as is shown at 56. The bore 24 within the tapered portion 40 may also be grooved, ribbed, or the like.

The instant invention, therefore, provides an assembly 10 for supporting a conduit, or the like, in an aperture 14 such that the first tapered portion 32 may be inserted into the aperture 14 as the slots 36 allow the tapered portion 32 to decrease in diameter therealong as the tapered portion is passing through the aperture 14 and whereby the tapered portion 32 will expand after having passed through the aperture 14 to secure the assembly in the aperture 14. A conduit, or the like, 16 may be disposed within the bore 24 of the body 22, either before or after the assembly is disposed in the aperture 14, to be secured against longitudinal movement therein by engagement of the nut 46 with the body 22 through the threaded coaction of the threads 48 and the threaded portion 38 whereby the tapered portion 52 of the nut 46 engages the tapered portion 40 of the body member 22 to reduce the outer diameter of the tapered portion 40 as allowed by the slots 42 such that the diameter of the bore 24 within the tapered portion 40 decreases to firmly grip the conduit 16. In the event it is desired to move the conduit 16 longitudinally through the aperture 14, the nut 46 may be loosened to release the gripping of the tapered portion 40 on the conduit 16 so that the conduit 16 may be moved to change the distance X it projects from the bulkhead 12, and thereafter the conduit 16 may again be secured against longitudinal movement by screwing the nut 46 onto the threaded portion 38 of the body 22.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An assembly for supporting a conduit or the like in an aperture comprising; an elongated body having a bore therethrough and first and second ends, a flange disposed radially about said body, a first tapered portion of increasing diameter extending from said second end of said body a predetermined distance therealong, a member having a second tapered portion therein to match said first tapered portion as said member is placed on said second end of said body, and said member and said body having coacting means for drawing said member onto said body so that said second tapered portion reduces the diameter of said first tapered portion as said member is drawn onto said body thereby to reduce the diameter of the bore passing through said first tapered portion so that a conduit disposed in said bore is prevented from moving longitudinally therein.

2. An assembly as set forth in claim 1 wherein said flange has a flexible portion thereof extending generally toward said first end of said body.

3. An assembly as set forth in claim 1 wherein at least a portion of said bore within said first tapered portion has means for frictionally gripping a conduit.

4. An assembly for supporting a conduit or the like in an aperture comprising; an elongated body having a bore therethrough and first and second ends, a flange disposed radially about said body, means between said first end and said flange for securing said body in an aperture, a threaded portion extending from said flange toward said second end of said body, a first tapered portion of decreasing diameter extending from said threaded portion to said second end of said body, a nut having threads therein engageable with said threaded portion, said threads extending a predetermined distance into said nut from one face thereof, and said nut having a second tapered portion therein of decreasing diameter extending from said threads to the other face thereof for engaging said first tapered portion of said body as said threads engage said threaded portion to reduce the diameter of the bore in said first tapered portion.

5. An assembly for supporting a conduit or the like in an aperture comprising; an elongated tubular body having a bore therethrough and first and second ends, a flange disposed radially about said body, means between said first end and said flange for securing said body member in an aperture, a threaded portion extending from said flange toward said second end of said body, a first tapered portion of decreasing diameter extending from said threaded portion to said second end of said body, at least one slot in said body extending from said second end thereof longitudinally therealong through said first tapered portion, a nut having threads therein engageable with said threaded portion, said threads extending a predetermined distance into said nut from one face thereof, and said nut having a second tapered portion therein of decreasing diameter extending from said threads to the other face thereof for engaging said first tapered portion as said threads engage said threaded portion to reduce the diameter of the bore passing through said first tapered portion.

6. An assembly for supporting a conduit or the like in an aperture comprising; an elongated tubular body having a bore therethrough and first and second ends, a flange disposed radially about said body, means between said first end of said body and said flange for securing said body in an aperture, a threaded portion extending from said flange toward said second end of said body, a first tapered portion of decreasing diameter extending from said threaded portion to said second end of said body, at least one slot in said body extending from said second end thereof longitudinally therealong through said first tapered portion, said bore in said tubular body having a greater diameter from said first end to said flange than through the remainder of said body, a nut having threads therein engageable with said threaded portion, said threads extending a predetermined distance into said nut from one face thereof, and said nut having a second tapered portion therein of decreasing diameter extending from said threads to the other face thereof so that said means may secure said body in an aperture to secure a conduit against longitudinal movement in said bore by engaging said threads in said nut on said threaded portion so that said second tapered portion in said nut engages said first tapered portion to reduce the outer diameter of said first tapered portion therealong as allowed by said slot for decreasing the diameter of said bore within said first tapered portion of said body to grip the conduit.

7. An assembly as set forth in claim 6 wherein said flange has a flexible portion thereof extending generally toward said first end of said body.

8. An assembly as set forth in claim 6 wherein at least a portion of said bore within said first tapered portion has means for frictionally gripping a conduit.

9. An assembly for supporting a conduit or the like in an aperture comprising; an elongated tubular body having a bore therethrough and first and second ends, a first tapered portion of increasing diameter extending a predetermined distance along said body from said first end thereof, a flange disposed radially about said body, said body having a recess disposed circumferentially thereabout between said first tapered portion and said flange, a threaded portion extending from said flange toward said second end of said body, a second tapered portion of decreasing diameter extending from said threaded portion to said second end of said body, a nut having threads therein engageable with said threaded portion, said threads extending a predetermined distance into said nut from one face thereof, and said nut having a third tapered portion therein of decreasing diameter extending from said threads to the other face thereof for engaging said second tapered portion of said body as said threads engage said threaded portion of said body to reduce the diameter of said bore passing through said second tapered portion of said body.

10. An assembly as set forth in claim 9 wherein said flange has a flexible portion thereof extending generally toward said first end of said body.

11. An assembly as set forth in claim 9 wherein at least a portion of said bore within said second tapered portion has means for frictionally gripping a conduit.

12. An assembly for supporting a conduit or the like in an aperture comprising; an elongated tubular body having a bore therethrough and first and second ends, a first tapered portion of increasing diameter extending a predetermined distance along said body from said first end thereof, a flange disposed radially about said body, said body having a recess disposed circumferentially thereabout between said first tapered portion and said flange, at least one slot in said body extending from said first end thereof longitudinally along said body through said first tapered portion and at least partially into said recess, a threaded portion extending from said flange toward said second end of said body, a second tapered portion of decreasing diameter extending from said threaded portion to said second end of said body, at least one slot in said body extending from said second end thereof longitudinally therealong through said second tapered portion, a nut having threads therein engageable with said threaded portion, said threads extending a predetermined distance into said nut from one face thereof, and said nut having a third tapered portion therein of decreasing diameter extending from said threads to the other face thereof for engaging said second tapered portion as said threads of said nut engage said threaded portion of said body for reducing the diameter of said bore extending through said second tapered portion of said body.

13. An assembly for supporting a conduit or the like in an aperture comprising; an elongated tubular body having a bore therethrough and first and second ends, a first tapered portion of increasing diameter extending a predetermined distance along said body from said first end thereof, a flange disposed radially about said body, body having a recessed portion disposed circumferentially thereabout between said first tapered portion and said flange, at least one slot in said body extending from said first end thereof longitudinally along said body through said first tapered portion and at least partially into said recessed portion for allowing the diameter along said first tapered portion to be decreased, a threaded portion extending from said flange toward said second end of said body, a second tapered portion of decreasing diameter extending from said threaded portion to said second end of said body, at least one slot in said body extending from said second end thereof longitudinally therealong through said second tapered portion for allowing the diameter along said second tapered portion to be decreased, said bore in said tubular body having a greater diameter from said first end through said first tapered portion and said recessed portion than through the remainder of said body, a nut having threads therein engageable with said threaded portion, said threads extending a predetermined distance into said nut from one face thereof, and said nut having a third tapered portion therein of decreasing diameter extending from said threads to the other face thereof for engaging said second tapered portion as said threads of said nut engage the threaded portion of said body to reduce the diameter of said bore through said second tapered portion of said body.

14. An assembly for supporting a conduit or the like in an aperture comprising; an elongated tubular body having a bore therethrough and first and second ends, a first tapered portion of increasing diameter extending a predetermined distance along said body from said first end thereof, a flange disposed radially about said body, said body having a recessed portion disposed circumferentially thereabout between said first tapered portion and said flange, biasing means disposed about a portion of said recessed portion and extending radially outward adjacent said flange, at least one slot in said body extending from said first end thereof longitudinally along said body through said first tapered portion and at least partially into said recessed portion, a threaded portion extending from said flange toward said second end of said body, a second tapered portion of decreasing diameter extending from said threaded portion to said second end of said body, at least one slot on said body extending from said second end thereof longitudinally therealong through said second tapered portion, said bore in said tubular body having a greater diameter from said first end through said first tapered portion and said recessed portion than through the remainder of said body, a nut having threads engageable with said threaded portion, said threads extending a predetermined distance into said nut from one face thereof, and said nut having a third tapered portion therein of decreasing diameter extending from said threads to the other face thereof.

15. An assembly as set forth in claim 14 wherein said flange has a flexible portion thereof extending generally toward said first end of said body.

16. An assembly as set forth in claim 14 wherein at least a portion of said bore within said second tapered portion has means for frictionally gripping a conduit.

17. An assembly for supporting a conduit or the like in an aperture comprising; an elongated tubular body having a bore therethrough and first and second ends, a first tapered portion of increasing diameter extending a predetermined distance along said body from said first end thereof, a flange disposed radially about said body, said body having a recessed portion disposed circumferentially thereabout between said first tapered portion and said flange, a resilient washer disposed about a portion of said recessed portion and extending radially outward adjacent said flange, a first plurality of slots in said body and extending from said first end thereof longitudinally along said body through said first tapered portion and at least partially into said recessed portion, a threaded portion extending from said flange toward said second end of said body, a second tapered portion of decreasing diameter extending from said threaded portion to said second end of said body, a second plurality of slots in said body and extending from said second end thereof longitudinally therealong through said second tapered portion, said bore in said tubular body having a greater diameter from said first end through said first tapered portion and said recessed portion than through the remainder of said body, a nut having threads therein engageable with said threaded portion, said threads extending a predetermined distance into said nut from one face thereof, and said nut having a third tapered portion therein of decreasing diameter extending from said threads to the other face thereof whereby said first tapered portion may be inserted into an aperture as said first plurality of slots allow said first tapered portion to decrease in diameter therealong as said first tapered portion is passing through said aperture and to expand when said first tapered portion is through said aperture thereby securing said recessed portion in said aperture and whereby a conduit or the like may be disposed in said bore and secured against longitudinal movement therein by engaging said threads in said nut on said threaded portion so that said third tapered portion in said nut engages said second tapered portion to reduce the outer diameter of said second tapered portion therealong as allowed by said second plurality of slots for decreasing the diameter of said bore within said second tapered portion of said body to grip the conduit.

18. An assembly as set forth in claim 17 wherein said flange has a flexible portion thereof extending generally toward said first end of said body.

19. An assembly as set forth in claim 17 wherein at least a portion of said bore within said second tapered portion has means for frictionally gripping a conduit.

20. An assembly for supporting a conduit or the like in an aperture comprising; a body having a bore therethrough and including means to secure said body in an aperture so that a conduit may be disposed in said bore and moved therethrough, and a member for coacting with said body, at least one of said member and said body having a tapered portion for coacting with the other, said member and said body having coacting means for drawing said member onto said body so that said body is reduced in size to reduce the diameter of said bore for selectively preventing movement of the conduit disposed in said bore.

21. An assembly for supporting a conduit or the like in an aperture comprising; a body member having a bore therethrough, said body member including means for securing said body member in an aperture to prevent movement thereof in either direction relative to said aperture, said body member including a movable portion for varying the size of said bore therethrough, and independent means adapted to be moved into coacting engagement with said movable portion of said body member as said body member is retained in an aperture by said firstmentioned means for selectively reducing the size of said bore in said body member so that the conduit may be gripped within said bore in said body member to prevent movement of the conduit relative to said body member.

References Cited by the Examiner

UNITED STATES PATENTS

| | | | |
|---|---|---|---|
| 1,835,155 | 12/1931 | Harbert | 248—56 |
| 2,717,792 | 9/1955 | Pelley | 248—56 X |
| 2,897,533 | 8/1959 | Bull et al. | 248—56 X |
| 2,937,834 | 5/1960 | Orenick et al. | 248—71 |
| 2,995,328 | 8/1961 | Whitted | 248—71 |

FOREIGN PATENTS

| | | |
|---|---|---|
| 241,729 | 10/1960 | Australia. |
| 671,823 | 10/1963 | Canada. |

CLAUDE A. LE ROY, *Primary Examiner.*